United States Patent Office 3,179,565
Patented Apr. 20, 1965

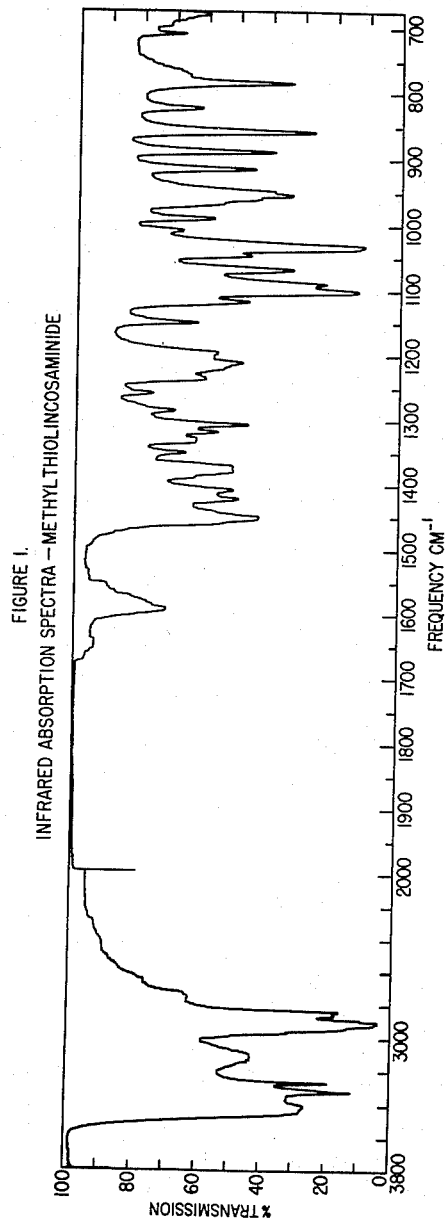

3,179,565
ANTIBIOTIC METHYLTHIOLINCOSAMINIDE
AND METHOD OF PRODUCTION
William Schroeder, Pavilion Township, Kalamazoo County, Mich., assignor to The Upjohn Company, Kalamazoo, Mich., a corporation of Delaware
Filed Apr. 29, 1963, Ser. No. 276,568
8 Claims. (Cl. 167—65)

This invention relates to a novel composition of matter and to a process for the preparation thereof, and is more particularly directed to the novel compound which has been given the trivial name methylthiolincosaminide (abbreviated to MTL), and to a process for producing the same.

Methylthiolincosaminide is obtained by hydrazinolysis of lincomycin, a new antibiotic whose characterization and preparation is described in U.S. Patent 3,086,912. The lincomycin, as the free base or as an acid addition salt, is brought into contact with hydrazine, advantageously as the hydrate, until substantial hydrazinolysis is obtained. The hydrazinolysis takes place at room temperature (25–35° C.) but higher or lower temperatures from about 0 to 130° C. can be used. The proportions of lincomycin and hydrazine can be varied but at least the stoichiometric amount of hydrazine is necessary to effect complete hydrazinolysis. Advantageously, an excess of hydrazine is used as a solvent for the reaction.

Methylthiolincosaminide exists either in the non-protonated (free base) form or the protonated (salt) form depending upon the pH of the environment. It forms stable protonates (acid addition salts) by neutralization of the free base with an acid or by metathesis between the protonated form of MTL and the anion of an acid. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methyl glutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, azobenzenesulfonic, octadecylsulfuric, picric, and like acids. These acid addition salts are useful in upgrading the free base. MTL also forms salts with penicillin. These salts have solubility characteristics which cause them to be useful in the isolation and purification of penicillins, particularly benzyl penicillin.

Methylthiolincosaminide is useful for the resolution of racemic acids. For example, MTL can be reacted with racemic acids to form diastereoisomeric acid addition salts which can be separated by fractional crystallization into diastereoisomers from which the optically active acids can be regenerated. MTL also is useful as an intermediate. It reacts with isocyanates to form urethanes and ureas, and can be used to modify polyurethane resins. For example, it can be reacted with an excess of toluene diisocyanate to form a prepolymer which can then be reacted with the polyol ethers and polyol esters commonly used to form polyurethanes; or MTL can be mixed with the polyol compound and the mixture then reacted with toluene diisocyanate. MTL can also be reacted with ethylene oxide, propylene oxide, and like alkylene oxides to form polyoxyalkylene MTL which can be reacted with toluene diisocyanate to form a polyurethane. MTL is particularly useful for producing rigid polyurethane foams. It also condenses with formaldehyde according to U.S. Patents 2,425,320 and 2,606,155, especially when the thiocyanic acid addition salt is employed, to form polymers which are useful as pickling inhibitors. Its fluosilicic acid addition salt is also useful as a mothproofing agent in accordance with U.S. Patents 1,915,334 and 2,075,359.

The following examples are illustrative of the process and products of the present invention but are not to be construed as limiting. All percentages are by weight and all solvent mixture proportions are by volume unless otherwise noted.

PREPARATION OF LINCOMYCIN

Lincomycin can be prepared in accordance with the procedures set out in U.S. Patent 3,068,912.

*Example 1*

Methylthiolincosaminide (MTL)

A solution of 4 g. of lincomycin in 20 ml. of hydrazine hydrate (98–100%) was refluxed for 21 hours. The excess hydrazine hydrate was distilled off in vacuo under nitrogen, while heating on the steam bath, to leave a pasty mass of crystals. The mass was cooled, acetonitrile was added, and the mixture was stirred until the paste was dispersed and the crystals suspended. The crystals were collected, washed with acetonitrile and with ether. The yield of white, crystalline methylthiolincosaminide after drying in vacuo at room temperature was 2.1 g. (84%). Recrystallization was accomplished by dissolving the substance in hot dimethylformamide and adding an equal volume of ethylene glycol dimethyl ether.

Methylthiolincosaminide has the following physical and chemical characteristics.

Melting point: 225–228° C.;
Optical rotation: $[\alpha]_D^{25}$ +276° (c.=.768 in water);
Titration: $pKa'$=7.45;
IR absorption spectrum in mineral oil mull: (Shown in FIG. 1 of the drawing).

| Cm$^{-1}$ Band | Intensity | Cm$^{-1}$ Band | Intensity |
|---|---|---|---|
| 3420 | S | 1225 | M |
| 3340 | S | 1218 | M |
| 3280 | S | 1203 | M |
| 3120 | M | 1157 | M |
| 2980 | M | 1125 | M |
| 2920 | S(oil) | 1107 | S |
| 2870 | S(oil) | 1096 | S |
| 2850 | S(oil) | 1075 | M |
| 2755 | M | 1055 | M |
| 2670 | W | 1016 | W |
| 1650 | W | 998 | M |
| 1598 | W | 989 | M |
| 1457 | M(oil) | 962 | S |
| 1428 | M | 955 | M |
| 1415 | M | 923 | M |
| 1386 | M | 898 | M |
| 1378 | M | 868 | S |
| 1358 | W | 831 | M |
| 1337 | M | 793 | S |
| 1325 | M | 777 | W |
| 1312 | M | 718 | W |
| 1292 | M | 703 | W |
| 1262 | M | 687 | M |
| 1242 | W | 667 | W |

*Elemental analysis.*—Calculated for $C_9H_{19}NO_5S$: C, 42.7; H, 7.56; N, 5.53; S, 12.66. Found: C, 42.6; H, 7.49; N, 5.75; S, 12.38.

Molecular weight: 253;
Equivalent weight: 257 (by titration).

I claim:
1. Methylthiolincosaminide, a compound which in its essentially pure crystalline form
   (a) has a molecular weight of 253;
   (b) has an optical rotation of $[\alpha]_D^{25}$= +276° (c.=.768 in water);
   (c) has the following elemental analysis: C, 42.6; H, 7.49; N, 5.75; S, 12.38;
   (d) has a characteristic infrared absorption spectrum as shown in FIG. 1 of the drawing;
   (e) has a melting point: 225–228° C.; and
   (f) has a $pKa'$ of 7.45.

2. Methylthiolincosaminide as defined in claim 1 in its essentially pure form.

3. A compound, methylthiolincosaminide, according to claim 1, in its essentially pure crystalline form.

4. The acid addition salts of methylthiolincosaminide, as defined in claim 1.

5. A process which comprises the hydrazinolysis of lincomycin with hydrazine to form methylthiolincosaminide.

6. A process which comprises the hydrazinolysis of lincomycin with hydrazine hydrate to form methylthiolincosaminide and isolating the methylthiolincosaminide so produced.

7. A process which comprises the hydrazinolysis of lincomycin with at least the stoichiometric amount of hydrazine to form methylthiolincosaminide.

8. A process which comprises the hydrazinolysis of lincomycin with at least the stoichiometric amount of hydrazine hydrate to form methylthiolincosaminide and isolating the methylthiolincosaminide so produced.

No references cited.

JULIAN S. LEVITT, *Primary Examiner*.

LEWIS GOTTS, *Examiner*.